(12) United States Patent
Buck

(10) Patent No.: US 8,774,338 B1
(45) Date of Patent: Jul. 8, 2014

(54) METHOD AND SYSTEM FOR PROVIDING A BIT STRING ON ELECTRONIC DEVICES

(71) Applicant: Brian James Buck, Livermore, CA (US)

(72) Inventor: Brian James Buck, Livermore, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

(21) Appl. No.: 13/766,021

(22) Filed: Feb. 13, 2013

(51) Int. Cl.
*H04L 7/00* (2006.01)
(52) U.S. Cl.
USPC .......................................... 375/355; 380/270
(58) Field of Classification Search
USPC ......... 375/219, 220, 260, 295, 316, 354, 355, 375/377; 341/50, 122–126, 132, 155, 200; 380/247, 249, 41, 270, 274
See application file for complete search history.

(56) References Cited

U.S. PATENT DOCUMENTS

| | | | | |
|---|---|---|---|---|
| 8,199,835 B2 * | 6/2012 | Amini et al. | | 375/243 |
| 8,275,123 B2 | 9/2012 | Bichler et al. | | |
| 8,423,255 B2 * | 4/2013 | Padmanabhan et al. | | 701/70 |
| 2003/0112978 A1 * | 6/2003 | Rodman et al. | | 380/277 |
| 2008/0019514 A1 | 1/2008 | Stromberg et al. | | |
| 2009/0046859 A1 | 2/2009 | Bichler et al. | | |
| 2013/0010956 A1 | 1/2013 | Bichler et al. | | |

OTHER PUBLICATIONS

Studer, Ahren et al., "Don't Bump, Shake on It: The Exploitation of a Popular Accelerometer-Based Smart Phone Exchange and Its Secure Replacement", ACSAC'1, Feb. 10, 2011.
Ahern Studer et al., Don't Bump, Shake on It: The Exploitation of a Popular Accelerometer-Based Smart Phone Exchange and Its Secure Replacement; ACSAC'11 Dec. 5-9, 2011, Orlando, Florida USA Copyright 2011 ACM 978-1-4503-0672-0/11/12; pp. 333-342.

* cited by examiner

*Primary Examiner* — Dac Ha
(74) *Attorney, Agent, or Firm* — Dergosits & Noah LLP

(57) ABSTRACT

A method for providing a bit string on at least two electronic devices is provided. A sensor input is received by sensors in the electronic devices and recorded by the electronic devices. Sensor profiles corresponding to the sensor input are generated by each of the electronic devices. Each sensor profile includes data points, at least one of which is associated with a peak amplitude and at least one of which is associated with a valley amplitude. Each device determines a respective sampling frequency based on a time interval between a data point associated with a zero amplitude and either a nearest data point associated with a peak amplitude or a nearest data point associated with a valley amplitude. Each device then generates a bit string based on sampled data points identified using the determined sampling frequency.

20 Claims, 4 Drawing Sheets

METHOD AND SYSTEM FOR PROVIDING A BIT STRING ON ELECTRONIC DEVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments relate generally to handheld electronic devices, and more specifically to systems and methods for providing a bit string on at least two electronic devices, such as mobile communication devices.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Mobile electronic communication devices have evolved beyond simple telephones and are now highly complex multifunctional devices with capabilities rivaling, and in some cases surpassing, those of desktop or laptop computers. In addition to voice communications, many mobile communication devices are capable of capturing images, text messaging, e-mail communications, internet access, social networking, and running full-featured application software. A full range of mobile applications are available from online application stores that can be downloaded onto mobile communication devices. These applications can be games and/or services that provide additional capabilities, such as online banking, stock trading, payments, and other financial activities. Furthermore, mobile communication devices can store confidential or private information such as access codes, passwords, account numbers, e-mail addresses, personal communications, phone numbers, and financial information.

When sensitive and/or private information is transmitted between devices over a public network, such as the Internet, the information is typically encrypted to prevent others from stealing the information. Oftentimes, encryption keys are used to encrypt and/or decrypt the information. In some cases, the communicating devices can share a common encryption key, which is used to encrypt and decrypt the information transmitted between the devices. In other circumstances, a key can be used to protect a device from receiving information from malicious sources. Here, when a device receives information from another device or user, an identification key stored on the receiving device can be used to authenticate the other device or user to ensure that the received information is from an authorized and safe source. For example, the received information can include a key, which is compared to the stored key to determine that the source is safe when the keys match.

In either or both of these cases, the encryption or identification key must be known to the communicating devices and therefore, the key must be initially transmitted from one device to another device. Because a secure communication channel is usually not established between electronic communication devices, a risk of the key being stolen exists when the key is transmitted from one device to another device.

To remedy this problem, some devices are capable of generating a key based on sensor data collected by a sensor in the device when the device is subjected to a physical or environmental stimulus, e.g., a shaking motion. Theoretically when more than one device is subjected to the same environmental stimulus and the sensors collecting the sensor data are of the same type, the keys generated by the devices should be identical. Nonetheless, this is seldom the case because sensors calibrated differently and/or provided by different manufacturers generally do not collect identical sensor data. Accordingly, the keys generated by the devices can be significantly different from each other and therefore unsuitable for secure communications between the devices.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
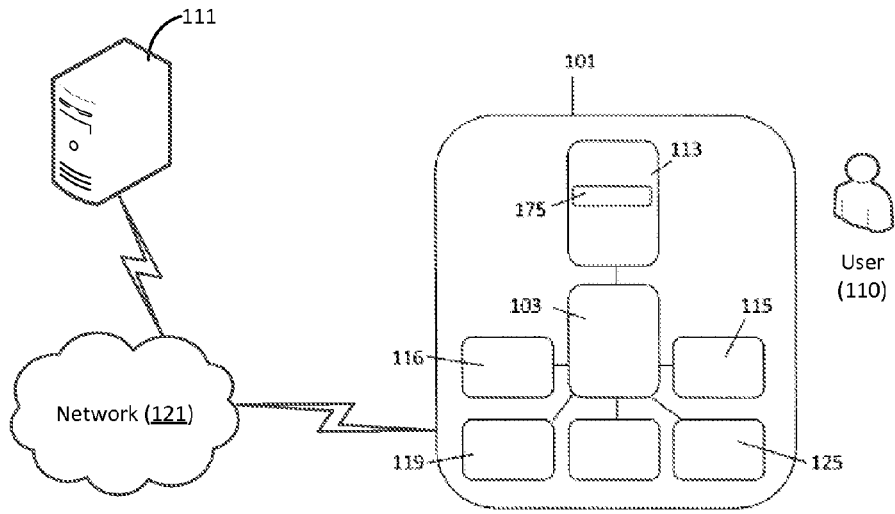
FIG. 1 is a block diagram illustrating an electronic device according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for providing a bit string on at least two mobile communication devices, each of which includes a plurality of sensors. In an embodiment, a sensor input is received by sensors in and recorded by the at least two electronic devices. Sensor profiles corresponding to the sensor input are generated on and by each of the electronic devices. Each sensor profile includes data points, at least one of which is associated with a peak amplitude and at least one of which is associated with a valley amplitude. According to an embodiment, different mobile communication devices can have clocks that are out of sync or that have different low level "tick" values. Thus, while the sensor profiles can have a similar shape, the timing aspects can be different.

To account for these differences, in an embodiment, each mobile communication device determines a local sampling frequency based on a time interval between a data point associated with a zero amplitude and either a nearest data point associated with a peak amplitude or a nearest data point associated with a valley amplitude, whichever is shorter. Each sampling frequency is then used by the determining mobile communication device to identify a set of sampled data points, which the mobile communication device then uses to generate a bit string. By determining local sampling frequencies and using the local sampling frequencies to identify sampled data points from local sensor profiles, the sampled data points from each sensor profile is synchronized, and therefore the bit strings generated by each device substantially match one another.

As used herein, the term "mobile communication device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. Specifically, mobile communication devices include devices for which wireless communication services such as voice, messaging, data, or other wireless Internet capabilities are a primary function. As used herein, a "mobile communication device" may also be referred to as an "electronic device," an "electronic client device," "mobile device," "mobile client," or "handset." However, a person having skill in the art will appreciate that while the present invention is disclosed herein as being used on mobile communication devices, the present invention may also be used on other computing platforms, including desktop, laptop, notebook, netbook, or server computers.

Prior to describing the subject matter in detail, an exemplary mobile communication device in which the subject matter may be implemented shall first be described. Those of ordinary skill in the art will appreciate that the elements illustrated in FIG. 1 may vary depending on the system implementation. With reference to FIG. 1, a block diagram of an embodiment of the mobile communication device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: Bluetooth, local area networks such as WiFi, and cellular networks such as GSM, CDMA or LTE.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 may operate in a networked environment using logical connections to one or more remote nodes 111 via a communication interface. The remote node may be another computer, a server, a router, a peer device or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
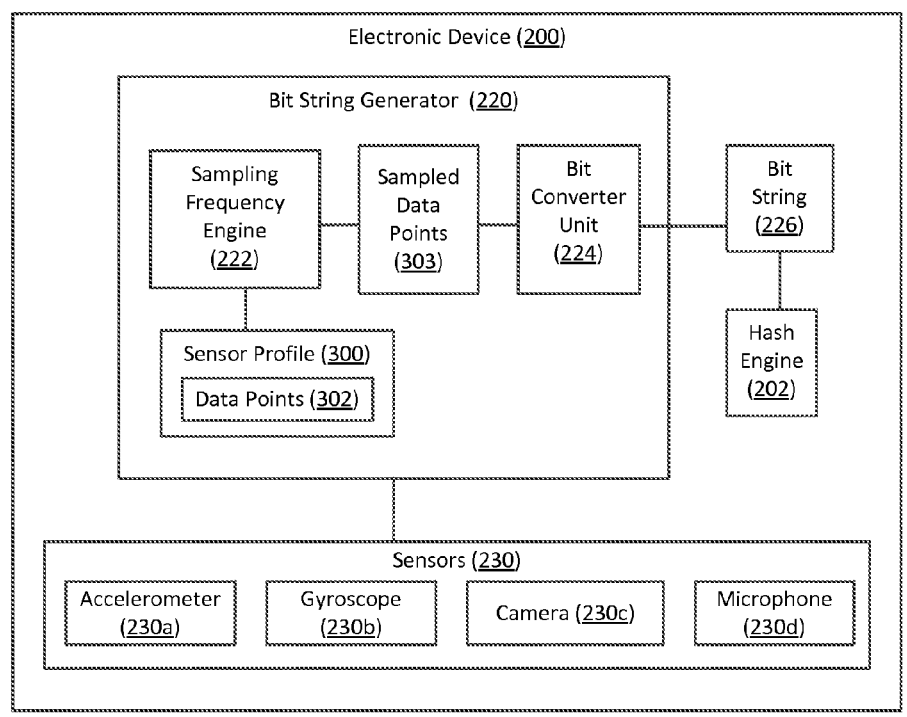
FIG. 2 is a block diagram illustrating an electronic device according to another embodiment.

FIG. 2 is a more detailed block diagram of a mobile communication device 200 having components, and/or their analogs, that are configured to provide a bit string according to an embodiment. As is shown in FIG. 2, the mobile communication device 200 can include a processor, memory, and a plurality of sensors 230. In an embodiment, the sensors 230 can include, an accelerometer 230a, a gyroscope 230b, a camera 230c, a microphone 230d, and other sensors 230. In an embodiment, each sensor 230 can collect sensor data specific to its sensor type. For example, the accelerometer 230a and the gyroscope 230b can be configured to collect inertial motion data, e.g., linear acceleration and angular rotation, of the communication device 200, the camera 230c can collect imaging data, and the microphone 230d can be configured to collect audio data. In an embodiment, the sensor data can comprise a data point, and over a period of time, the collected sensor data can form a sensor reading comprising a plurality of data points. It should be understood that the sensors 230 can include sensors that reside within the mobile communication device 200 or which reside outside the device but are connected to it by a wired or wireless connection.

According to an embodiment, the mobile communication device 200 can be configured to provide an execution environment configured to support operation of a Bit String Generator ("BSG") Unit 220. The BSG Unit 220 can be configured, in an embodiment, to generate a random string of bits based on a sensor reading associated with a sensory input received by at least one of the sensors 230. For example, the sensory input can include a movement of the device 200 in a pattern(s) at a particular velocity or velocities, and the associated sensor reading can include acceleration data points. Alternatively or in addition, the sensory input can include a sound or series of sounds, such as a song or audio recording, and the associated sensor reading can include decibel level or wavelength data points. The sensory input can also include capturing an image, and the associated sensor reading can include light intensity data points.

According to an embodiment, the BSG Unit 220 can be configured to begin recording the sensory input received by the sensor(s) 230 when a predetermined trigger is detected by the BSG Unit 220. For example, the trigger can be detected when a record button presented on the device's display is selected by the device's user 110. Alternatively or in addition, the trigger can be detected when the user 110 issues a voice command to begin recording. In another embodiment, the trigger to begin recording can be detected when the user 110 displaces the electronic device in a specified pattern or manner. For example, an initiation movement to trigger the recording of the sensory input can include a quick shake of the device which causes the accelerometer 230a to receive an acceleration sensor reading exceeding a threshold acceleration value. When such an acceleration sensor reading is received, the BSG Unit 220 can be configured to detect the trigger and to begin recording the sensory input. In an embodiment, the BSG Unit 220 can cause the device 200 to provide an indication, e.g., an audible "beep" or a visual display, to the user 110 that the record trigger has been detected.

In an embodiment, after detecting the initiation movement, the BSG Unit 220 can be configured to begin recording the sensory input immediately. Alternatively, the recording can begin at a specified time period, e.g., five seconds, after the initiation movement, and/or when a received sensor reading is equal to a specified value. For example, in an embodiment, the recording of the sensory input can begin after detecting the initiation movement and when a subsequently received sensor reading is zero (0).

In a manner similar to initiating the recording, the BSG Unit 220 can be configured to terminate the recording of the sensory input received by the sensor(s) 230 when a predetermined termination trigger is detected by the BSG Unit 220. For example, the termination trigger can be detected when a stop record button is selected by the device's user 110. Alternatively or in addition, the termination trigger can be detected when the user 110 issues a voice command to stop recording and/or when a specified period of time has expired. In another embodiment, the trigger to terminate recording can be detected when the user 110 displaces the electronic device in a specified pattern or manner. For example, a termination movement to trigger the end of the recording of the sensory input can include another quick shake of the device which causes the accelerometer 230a to receive an acceleration sensor reading exceeding the threshold acceleration value.

According to an embodiment, as the sensory input is being recorded, the sensory input can be received by a low pass filter to remove high frequency transients, or in another embodiment, transmitted unfiltered to the BSG Unit. When the sensory input is recorded, the BSG Unit 220 can be configured to generate a corresponding sensor profile 300 based on the data points 302 collected by the sensor(s) 230 and optionally filtered by the low pass filter.

Figure 3:
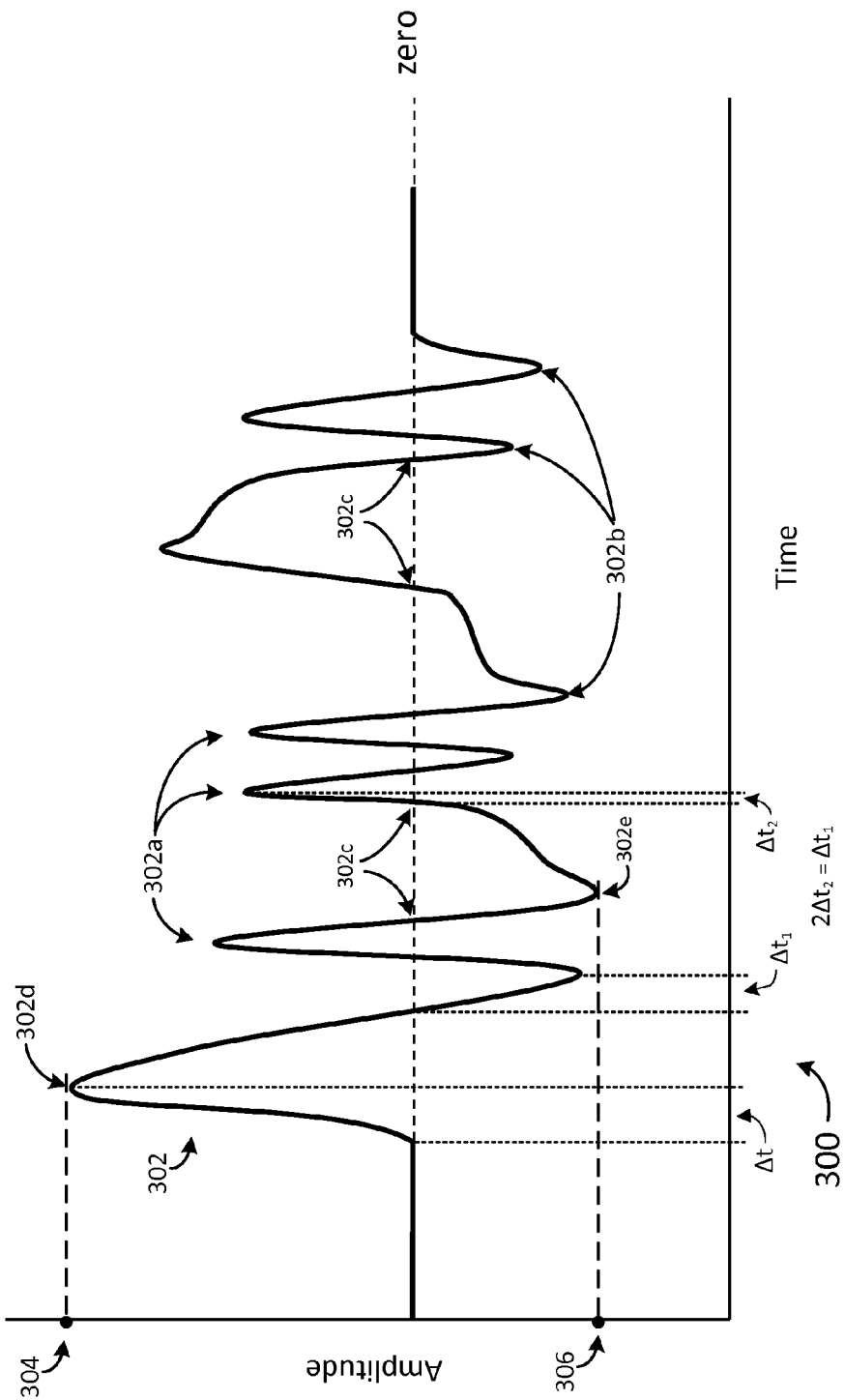
FIG. 3 is a diagram illustrating a sensor profile according to an embodiment.

FIG. 3 illustrates an example of a sensor profile 300 generated by the BSG Unit 220. In an embodiment, the example sensor profile 300 corresponds to a sensory input received by the accelerometer 230a, the gyroscope 230b, or by the microphone 230d where the amplitude of the sensor data is recorded against time. In another embodiment, when the sensory input is received by the camera 230c, the amplitude of the sensor data can be recorded against distance. As is shown in FIG. 3, the sensor profile 300 includes one or more peak data points 302a associated with one or more peak amplitudes and one or more valley data points 302b associated with one or more valley amplitudes. Data points associated with an amplitude of zero (0) are zero data points 302c. As data points 302 are received and included in the sensor profile 300, the BSG Unit 220 can be configured to generate a bit string 226 based on at least one of the data points 302 of the sensor profile 300.

According to another embodiment, the BSG Unit 220 can be configured to generate the corresponding sensor profile 300 and the bit string 226 while the sensor input is being recorded. In this case, the BSG Unit 220 can be configured to terminate the recording of the sensory input when the length of the bit string 226 generated exceeds a specified number of bits. In an embodiment, the BSG Unit 220 can be configured to provide a first indication to the user 110 when the generated bit string 226 is less than the specified number of bits, and can also be configured to provide a different second indication to the user 110 when the length of the generated bit string 226 is at least the specified number of bits. For example, the BSG Unit 220 can cause the device 200 to emit a low pitched tone when the length of the bit string 226 is less than the specified length, and can cause the device 200 to emit a higher pitched tone when the length exceeds the specified length.

According to an embodiment, while the first indication is provided, the BSG Unit 220 can be configured to reject a termination movement to trigger the end of the recording of the sensory input. When the length of the bit string 226 exceeds the specified length, the BSG Unit 220 can automatically terminate the recording in an embodiment. Alternatively, when the second indication is provided, the BSG Unit 220 can be configured to accept a termination movement, thereby allowing the bit string 226 to be of variable length and at least the specified length.

Figure 4:
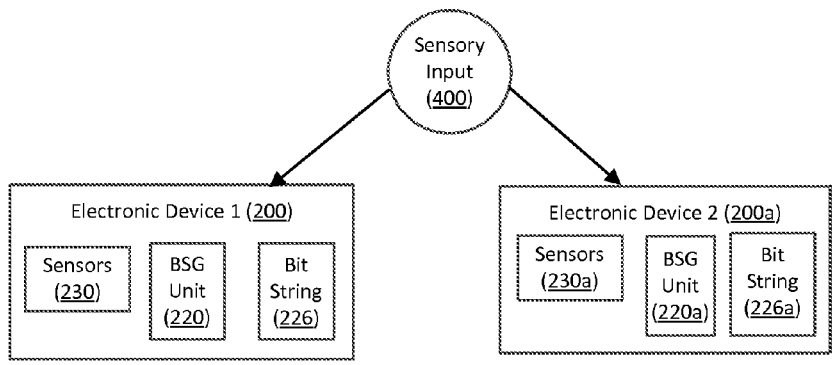
FIG. 4 is a block diagram illustrating more than one electronic device according to an embodiment.

FIG. 4 illustrates first and second electronic devices 200, 200a receiving a sensory input 400. In an embodiment, the devices 200, 200a can receive the sensory input 400 simultaneously or at different times. For example, the user 110 of the first device 200 can connect or hold the second device 200a to the first device 200 and displace both devices in a pattern for a period of time. Alternatively, or in addition, an audio recording can be played and the microphone in each of the first and second devices 200, 200a can receive the sensory input 400. In either case, the devices 200, 200a can receive the sensory input 400 together or at different times.

In an embodiment, when the same type(s) of sensor(s) 230, 230a in each mobile communication device 200, 200a receive the same or substantially the same sensory input 400, BSG Units 220, 220a in each device 200, 200a can independently generate a random string of bits 226, 226a. Because both bit strings 226, 226a are generated based on the respective sensor readings associated with the same or substantially the same sensory input 400, the bit strings 226, 226a themselves should theoretically be identical or substantially identical. This can be very useful because then the bit strings 226, 226a can be used for secure communications between the devices 200, 200a without having to transmit a bit string, e.g., 226, from one device 200 to the other 200a.

Nevertheless, the sensors 230, 230a in the different devices are rarely identical to one another due to differences in calibration and/or production specifications, and therefore the sensor readings associated with the same sensory input 400 are different. For example, when one sensor 230 is calibrated differently from another sensor 230a, the amplitude measurements of the sensor data can be different. Moreover, the sensor readings can differ when the internal clocks of the devices 200, 200a are not synchronized. Accordingly, unless the sensor readings are manipulated in some manner to compensate for sensor and device differences, the resulting generated bit strings 226, 226a will be different and cannot be used for secure communications between the devices 200, 200a.

To address this issue, according to an embodiment, the BSG Unit 220, 220a in each of the electronic devices 200, 200a can be configured to normalize the local sensor readings to minimize differences due to calibration, sensor manufacturers and/or clock synchronization. For example, in an embodiment, when device clocks are out-of-sync or when the devices have different low level "tick" values, differences due to internal timing systems can be minimized by calculating a local sampling frequency based on the local sensor profile 300 generated by each device 200, 200a. In an embodiment, when the BSG Unit, e.g., 220, in the first device 200 generates the sensor profile 300, a sampling frequency engine 222 in each BSG Unit 220 can be configured to analyze the local sensor profile 300 and to determine a sampling frequency based on a time interval between a zero data point 302c associated with a zero amplitude and either a nearest peak data point 302a or a nearest valley data point 302b.

According to an embodiment, the sampling frequency engine 222 can identify each time interval, $\Delta t$, between a zero data point 302c and either a nearest valley data point 302b, e.g., $\Delta t_1$, or a nearest peak data point 302a, e.g., $\Delta t_2$. In an embodiment, the shortest time interval, e.g., $\Delta t_2$, can be selected to be the local sampling frequency. Once the local sampling frequency is determined, each identified time interval $\Delta t$ can be divided into sub-intervals of the shortest time interval $\Delta t_2$. For example, when $\Delta t_1$ is 2 $\Delta t_2$, the time interval $\Delta t_1$ is divided into two (2) sub-intervals.

In an embodiment, a sampled data point 303 can be selected from each sub-interval. Accordingly, two (2) sampled data points 303 will be selected from the time interval $\Delta t_1$ to generate the bit string 226. Because $\Delta t_2$ is the shortest time interval, any time interval between a zero data point 302c and either a nearest peak data point 302a or a nearest valley data point 302b includes at least one sampled data point 303. In an embodiment, the sampled data point 303 can be selected at a midpoint of the sub-interval so that the sampled data points 303 of the time interval are equally spaced in time, and the group of sampled data points 303 are centered within the time interval.

In another embodiment, the number of sampled data points 303 selected in each time interval can be a predetermined value, and therefore, the sampling frequency for any particular time interval can vary depending on the length of the time interval. For example, when $\Delta t_1$ is 2 $\Delta t_2$, the sampling frequency in $\Delta t_2$ is twice the sampling frequency in $\Delta t_1$. In an embodiment, the sampled data points 303 can be selected so that they are equally spaced in time within the time interval.

According to an embodiment, the sampled data points 303 are selected in each electronic device 200, 200a based on locally determined sampling frequencies that take into account the device's internal timing systems. Thus, the sampled data points 303 in the first device 200 correspond to the same sampled data points 303 in the second device 200a. Once the sampled data points 303 are identified in each device 200, 200a, the BSG Units 220, 220a can be configured to independently generate bit strings 226, 226a based on the amplitudes of each respective sampled data point 303. As mentioned above, however, the amplitudes of data points 302 in the first device 200 can differ from those in the second device 200a when the first device's sensors 230 are not calibrated with the second device's sensors 230a.

Figure 5:
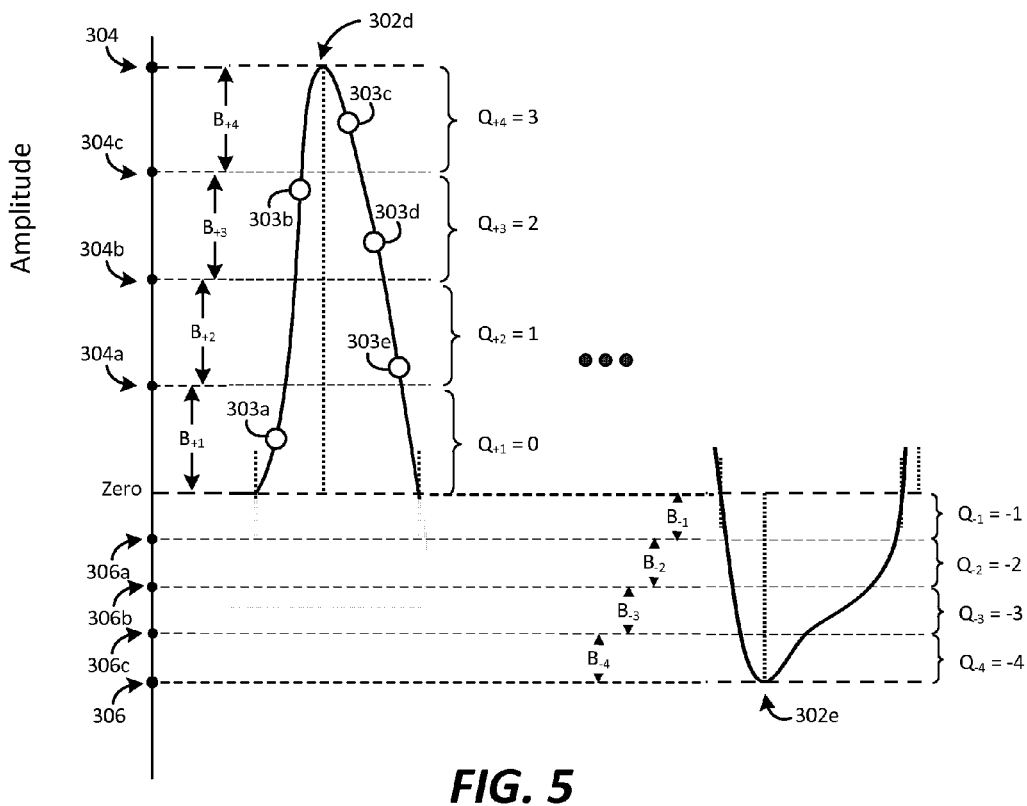
FIG. 5 is a diagram illustrating portions of the sensor profile of FIG. 3 according to an embodiment.

To address this issue, according to an embodiment, the BSG Unit 220, 220a is configured to provide a plurality of quantization levels, into which amplitudes of sampled data points 303 are quantized. FIG. 5 illustrates a portion of the sensory profile 300 of FIG. 3 that includes a positive peak data point 302d and a portion of the sensory profile 300 that includes a negative valley data point 302e. In an embodiment, the BSG Unit 220, 220a can provide a specified number of positive and/or negative quantization levels, and each quantization level, $Q_i$, can be associated with a quantization value and a non-overlapping amplitude band, $B_i$, ranging from a first amplitude to a second amplitude. For example, in FIG. 5, four (4) positive quantization levels, $Q_{+1}$ to $Q_{+4}$, and four (4) negative quantization levels, $Q_{-1}$ to $Q_{-4}$, are provided. A lowest positive quantization level $Q_{+1}$ is associated with an amplitude band, $B_{+1}$, ranging from zero amplitude up to and including a first threshold amplitude value 304a. As is shown, the next quantization level $Q_{+2}$ is associated with an amplitude band $B_{+2}$ ranging from an amplitude greater than the first threshold value 304a up to and including a second threshold amplitude value 304b, and a third quantization level $Q_{+3}$ is associated with an amplitude band $B_{+3}$ ranging from an amplitude greater than the second threshold value 304b up to and including a third threshold amplitude value 304c. Similarly, the highest positive quantization level $Q_{+4}$ is associated with an amplitude band $B_{+4}$ ranging from an amplitude greater than the threshold amplitude value immediately below it, e.g., the third threshold value 304c, up to and including a maximum amplitude 304. According to an embodiment, the maximum amplitude 304 can be associated with a maximum peak data point 302d of the sensory profile 300.

In a similar manner, a highest negative quantization level, $Q_{-1}$, can be associated with an amplitude band ranging from zero amplitude down to and including a negative first threshold amplitude value 306a, and a lowest negative quantization level, $Q_{-4}$, can be associated with an amplitude band ranging from an amplitude less than the negative threshold amplitude value immediately above it, e.g., 306c, down to and including a minimum amplitude 306. According to an embodiment, the minimum amplitude 306 can be associated with a minimum valley data point 302e of the sensory profile 300.

In an embodiment, the amplitude range of each amplitude band, $B_{+i}$, associated with each positive quantization level, $Q_{+i}$, can be the maximum amplitude 304 divided by the specified number of positive quantization levels, and the amplitude range of each amplitude band $B_{-i}$ associated with each negative quantization level $Q_{-i}$ can be the minimum amplitude 306 divided by the specified number of negative quantization levels. As is shown, while the number of positive quantization levels can be equal to the number of negative quantization levels, in another embodiment, the number of positive and negative quantization levels can be different. In yet another embodiment, only positive or negative quantization levels can be provided. In any case, the devices 200, 200a that record the sensory input 400 provide the same plurality of quantization levels, i.e., the same number of positive and/or negative quantization levels, and each of the quantization levels are associated with the same quantization values.

In an embodiment, when the number of positive and negative quantization levels is the same and the absolute value of the minimum amplitude 306 is equal to the maximum amplitude 304, the amplitude range of each amplitude band associated with either a positive or negative quantization level can be equal. In another embodiment, as shown in FIG. 5, when the absolute value of the minimum amplitude 306 is not equal to the maximum amplitude 304, e.g., when the minimum amplitude 306 is associated with the minimum valley data point 302e and the maximum amplitude 304 is associated with the maximum peak data point 302d, the amplitude range of each amplitude band associated with a positive quantization level can be different from that of each amplitude band associated with a negative quantization level.

According to an embodiment, once the positive and/or negative quantization levels are provided, each sampled data point 303a-303e can be associated with one of the plurality of quantization levels $Q_i$ based on each sampled data point's amplitude. For example, in FIG. 5, a first sampled data point 303a is associated with a first positive quantization level $Q_{+1}$ because its amplitude is greater than zero but less than the first positive threshold value 304a. Similarly, a second sampled data point 303b and a fourth sampled data point 303d are associated with the third positive quantization level $Q_{+3}$ because the respective amplitudes are within the amplitude band, $B_{+3}$, associated with the third positive quantization level $Q_{+3}$. As is shown, a third sampled data point 303c is associated with the highest positive quantization level $Q_{+4}$ and a fifth sampled data point 303e is associated with the second positive quantization level $Q_{+2}$.

In an embodiment, because each amplitude band associated with each quantization level is determined locally based on the sensory profile 300 generated locally on each device 200, 200a, and because the local sampled data points 303 refer to the same or substantially the same portions of the respective sensory profiles 300, each sampled data point 303 in the first device 200 and each corresponding sampled data point 303 in the second device 200a can be associated with the same quantization level. Accordingly, when the first 200 and second 200a devices are not calibrated to one another, the amplitude associated with the first sampled data point 303a from the sensory profile 300 generated by the first device 200 can be different from the amplitude associated with the first sampled data point 303a from the sensory profile 300 generated by the second device 200a. Nevertheless, according to an embodiment, despite having different amplitudes, both of the first sampled data points 303a can be associated with the same quantization level.

Once the sampled data points 303a-303e are associated with one of the quantization levels, the BSG Unit 220, 220a can be configured to assign the quantization value associated with the quantization level to each sampled data point associated with the quantization level. Accordingly, referring again to FIG. 5, the first positive quantization level $Q_{+1}$ is associated with a value of zero (0), and therefore, the first sampled data point 303a is assigned a value of zero (0). Similarly, the second 303b and fourth 303d sampled data points are assigned a value of two (2), the third sampled data point 303c is assigned a value of three (3), and the fifth sampled data point 303e is assigned a value of one (1). Thus, in a time-based sequence, the sampled data points 303a-303e can be represented by a sting of quantization values: {0, 2, 3, 2, 1}. Because the sampled data points 303a-303e in both the first 200 and second 200a devices are associated with the same or substantially the same quantization levels, both sets of sampled data points 303a-303e can be represented by the same or substantially the same string of quantization values.

According to an embodiment, the BSG Unit 220, 220a can be configured to convert at least some of the values of the sampled data points 303a-303e into a bit representation. For example, in an embodiment, the BSG Unit 220, 220a can include a bit converter unit 224 configured to convert the quantization value of at least one sampled data point, e.g., 303a, into a binary representation of ones (1) and/or zeros (0). In an embodiment, the bit converter unit 224 can convert each quantization value to a binary bit representation using 2s-complements. Thus, for example, the string of values representing the sampled data points 303a-303e can be converted into the following bit representations: {000, 010, 011, 010, 001}. Because the sampled data points 303a-303e in both the first 200 and second 200a devices can be represented by the same or substantially the same string of values, both sets of values can be converted into the same or substantially the same set of bit representations.

In an embodiment, once at least some of the quantization values of the sampled data points are converted in the bit representations, the BSG Unit 220, 220a can be configured to concatenate the bit representations to generate matching or substantially matching bit strings 226, 226a. In the discussion above, the BSG Unit 220 uses sampled data points 303 from one sensor profile 300 to generate the bit string 226. In another embodiment, the sampled data points 303 can be derived from more than one sensor profile 300 generated from data points 302 collected by different types of sensors 230. For example, one sensor profile 300 can include data points 302 collected from the accelerometer 230a and another sensor profile 300 can include data points collected from the microphone 230d. According to an embodiment, the bit string 226 can include the concatenation of bit representations of the sampled data points 303 from each different type of sensor 230a, 230d. In an embodiment, the electronic device 200 can include a hash engine 202, which is configured to receive the bit string 226 and to compute hash value of the bit string 226 or a sequence of hash values for contiguous sections of the bit sting 226.

In another embodiment, when the sensor profile 300 is substantially sinusoidal, the concatenated bit representations of the sampled data points 303 can lack a high degree of randomness because of the redundant nature of the sensor profile 300. In this case, the BSG Unit 220, 220a can be configured to apply a data compression algorithm to the concatenated bit representation of the sampled data points 303 to minimize redundancy in the bit string 226. For example, the BSG Unit 220 can be configured to transform a redundant bit string into a more random bit string by compressing the bit string 226 using a known data compression algorithm. In an embodiment, the hash engine 202 can receive the compress bit string and can compute a sequence of hash values for contiguous sections of the compressed bit string. The bit string 226 resulting from this transformation can appear more random to an observer.

Figure 6:
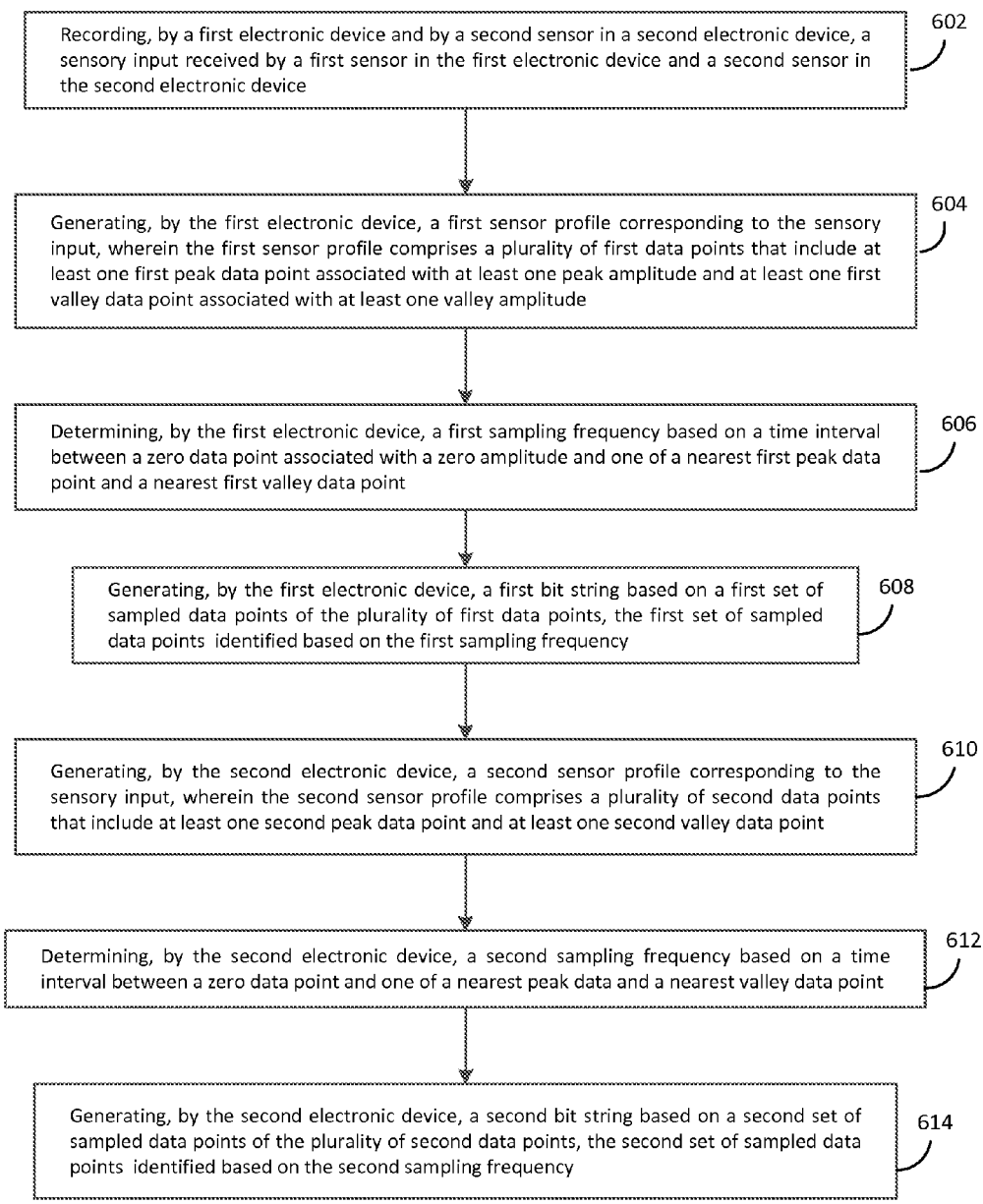
FIG. 6 is an operational flow diagram illustrating a high level overview of a method for providing a bit string on at least two electronic devices according to an embodiment.

FIG. 6 is a flow diagram illustrating a method for providing a bit string on at least two electronic devices according to an embodiment. The method illustrated in FIG. 6 can be carried out by, for example, at least some of the components in the example electronic device(s) illustrated in FIG. 1, FIG. 2, and FIG. 4, but can also be carried out in environments other than those illustrated in FIG. 1, FIG. 2, and FIG. 4. According to an embodiment, the method 600 begins, in block 602, when a sensory input 400 is recorded by a first 200 and a second 200a electronic device. As noted above, the sensory input 400 can be received by a first 230 and a second sensor 230a in the first 200 and the second 200a electronic devices respectively. Next, each of the first 200 and second 200a electronic devices independently generate sensor profiles 300 corresponding to the sensory input 400 in blocks 604 and 610. As noted above, each sensor profile 300 comprises, in an embodiment, a plurality of data points 302 that include at least one peak data point 302a associated with at least one peak amplitude and at least one valley data point 302b associated with at least one valley amplitude.

When the sensor profiles 300 are generated, the first electronic device 200 determines a first local sampling frequency in block 606 and the second electronic device 200a determines a second local sampling frequency in block 612. In an embodiment, each local sampling frequency is based on a time interval between a zero data point 302c associated with a zero amplitude and either a nearest peak data point 302a or a nearest valley data point 302b. Next, the first electronic device 200 generates a bit string 226 based on a set of sampled data points 303 identified based on the local sampling frequency in block 606, and the second electronic device 200a generates a bit string 226a based on a set of sampled data points 303 identified based on the local sampling frequency in block 614. According to an embodiment, the bit string 226 generated by the first device 200 substantially matches the bit string 226a generated by the second device 200.

According to an embodiment, the bit strings 226, 226a can be used for a variety of purposes, including to identify the fact that the two devices each know the same secret, i.e., the generated bit string 226, 226a. In an embodiment, the bit strings 226, 226a can be used as an identifier to be matched. Alternatively, or in addition, the bit strings 226, 226a can be used as a one-time pad in a cryptographic communication. Moreover, the bit strings 226, 226a can be used to drive a key generation process to create a private and a public cryptographic key, or they could be used to drive a key generation process to create a symmetric encryption key.

In an embodiment, a matching process given two bit strings 226, 226a from different devices 200, 200a, can have a preconfigured allowable error amount that can be defined as an allowable edit distance between the two strings 226, 226a. Such a preconfigured allowable error amount can be useful when significant differences in how the sensors in the different devices are manufactured or calibrated exist and the normalization processes described above do not sufficiently mitigate these differences. In this case, the edit distance between the bit strings can be analogous to the Damerau-Levenshtein distance between two strings, and an algorithm for computing string to string edit distances can be employed using the concepts of edit weights and operations of substitution, transposition, insertion, and deletion. For instance, the Wagner-Fischer algorithm (see R. A. Wagner and M. J. Fischer, "The String-to-String Correction Problem." Journal of the ACM, 21(1):168-173 (1974)) or the Hirschberg algorithm (see D. S. Hirschberg, Commun. ACM 18, 6 341-343 (June 1975)) are well known linear space algorithms for computing maximal common subsequences that can be employed as the basic algorithm. In an embodiment, for bit strings 226, 226a of length 1024 bits, the matching process may be preconfigured to allow an edit distance of 16, as measured by the number of bit-level insertion, deletion, or substitution operations required to transform one of the bit strings 226 into the other bit string 226a.

In an embodiment, the result of a matching process can be a yes (the bit strings match within allowable error amount) or a no (they do not). When a match is determined, a preferred bit string, e.g., 226, of the two bit strings 226, 226a can be echoed back to one of the devices so that both devices have the identical bit string 226.

According to an embodiment, an application of devices 200, 200a each having an identical or substantially identical bit string 226, 226a allows for a blind rendezvous process mediated by a server 111 entrusted to receive the bit strings 226, 226a. For example, the devices 200, 200a can transmit their bit strings 226, 226a to the server 111, which can determine whether the bit strings 226, 226a match. When the bit strings 226, 226a are received within a configurable amount of time and a match is determined, the server 111 can be configured to establish a communications channel either directly between the devices 200, 200a or indirectly channeled through the server 111.

In another embodiment, the first device 200 can transmit hashes of parts of its bit string 226 to the other device 200a, or to a server 111 acting on behalf of the devices 200, 200a. For example, the following sequence of 64 hashes can be sent:

Hash of {bits 16:1023}
Hash of {bits 0:15; 32:1023}
Hash of {bits 0:31; 48:1023}
Hash of {bits 0:47; 64:1023}
...
Hash of {bits 0:511; 528:1023}
Hash of {bits 0:527; 544:1023}
...
Hash of {bits 0:991; 1008:1023}
Hash of {bits 0:1007}

At the other device 200a or at the server 111, the matching process can consider there to be an allowable match if a specified number of hashes "match." For instance, when the length of the bit string is 1024 bits, and allowed edit distance is 16, a matching determination can be made when 61 of the 64 hashes match. In this matching process, the original bit string is not transmitted via any network or known at the place of matching. Therefore, the bit string 226 remains secure.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing a bit string on at least two electronic devices, the method comprising:
    recording, by a first electronic device and by a second electronic device, a sensory input received by a first sensor in the first electronic device and a second sensor in the second electronic device;
    generating, by the first electronic device, a first sensor profile corresponding to the sensory input, wherein the first sensor profile comprises a plurality of first data points that include at least one first peak data point associated with at least one peak amplitude and at least one first valley data point associated with at least one valley amplitude;
    determining, by the first electronic device, a first sampling frequency based on a time interval between a zero data point associated with a zero amplitude and one of a nearest first peak data point and a nearest first valley data point;
    generating, by the first electronic device, a first bit string based on a first set of sampled data points of the plurality of first data points, the first set of sampled data points identified based on the first sampling frequency;
    generating, by the second electronic device, a second sensor profile corresponding to the sensory input, wherein the second sensor profile comprises a plurality of second data points that include at least one second peak data point and at least one second valley data point;
    determining, by the second electronic device, a second sampling frequency based on a time interval between a zero data point and one of a nearest peak data and a nearest valley data point; and
    generating, by the second electronic device, a second bit string based on a second set of sampled data points of the plurality of second data points, the second set of sampled data points identified based on the second sampling frequency, wherein the first bit string substantially matches the second bit string.

2. The method of claim 1 wherein the first sensor in the first electronic device and the second sensor in the second electronic device are of a same sensor type.

3. The method of claim 1 wherein the sensory input comprises at least one of a movement of the first and second electronic devices, an auditory input, and an optical input.

4. The method of claim 1 wherein prior to recording the sensory input, the method comprises detecting, by the first and second sensors, an initiation movement to begin the recording of the sensory input.

5. The method of claim 4 wherein detecting the initiation movement comprises receiving, by an accelerometer in the first and second devices, an acceleration sensor reading exceeding a threshold acceleration value.

6. The method claim 4 wherein the first and second bit strings are generated while the sensory input is recorded and wherein the method further comprises automatically terminating the recording of the sensory input when the first and second bit strings exceed a specified length.

7. The method of claim 4 further comprising detecting, by the first and second sensors, a termination movement to end the recording of the sensory input.

8. The method of claim 7 wherein the first and second bit strings are generated as the sensory input is recorded and wherein the method further comprises providing a first indication when the first and second bit strings are less than a specified length, and providing a second indication, different from the first indication, when the first and second bit strings are at least the specified length.

9. The method of claim 1 wherein the sensory input is recorded by the first electronic device and the second electronic device simultaneously.

10. The method of claim 1 wherein the first sampling frequency is a shortest time interval between a zero point and either a nearest first peak data point or a nearest first valley data point, and wherein any time interval between a zero data point and either a nearest first peak data point or a nearest first valley data point comprises at least one sampled data point.

11. The method of claim 1 wherein generating the first bit string comprises:
    providing, by the first electronic device, a plurality of quantization levels, wherein each quantization level is associated with a quantization value and an amplitude band ranging from a first amplitude to a second amplitude;
    associating, by the first electronic device, each sampled data point of the first set with one of the plurality of quantization levels based on each sampled data point's amplitude;
    assigning the quantization value of the quantization level to each sampled data point associated with the quantization level;
    converting the quantization value of at least a portion of the sampled data points of the first set into a bit representation; and
    concatenating the bit representations of the at least a portion of the sampled data points.

12. The method of claim 11 wherein the plurality of quantization levels includes a specified number of positive quantization levels, wherein a lowest positive quantization level is associated with an amplitude band ranging from zero to a first threshold amplitude, and wherein a highest positive quantization level is associated with an amplitude band ranging from an amplitude greater than the first threshold amplitude to a maximum amplitude.

13. The method of claim 12 wherein the plurality of quantization levels includes a specified number of negative quantization levels, wherein a highest negative quantization level is associated with an amplitude band ranging from zero to a negative first threshold amplitude, and wherein a lowest negative quantization level is associated with an amplitude band ranging from an amplitude less than the first negative threshold amplitude to a minimum amplitude.

14. The method of claim 13 wherein an amplitude range of the amplitude band associated with each positive quantization level is the maximum amplitude divided by the specified number of positive quantization levels and an amplitude range of the amplitude band associated with each negative quantization level is the minimum amplitude divided by the specified number of negative quantization levels.

15. The method of claim 14 wherein the specified number of positive quantization levels is equal to the specified number of negative quantization levels, and wherein the amplitude range of the amplitude band associated with each positive quantization level is equal to the amplitude range of the amplitude band associated with each negative quantization level when an absolute of the minimum amplitude is equal to the maximum amplitude.

16. The method of claim 15 wherein the plurality of first data points includes a maximum peak data point associated with a maximum peak amplitude greater than zero and a minimum valley data point associated with a minimum valley amplitude less than zero, wherein the maximum amplitude is the maximum peak amplitude, and the minimum amplitude is the minimum valley amplitude, and wherein the amplitude range of the amplitude band associated with each positive quantization level is different from the amplitude range of the amplitude band associated with each negative quantization level when an absolute of the minimum valley amplitude is different from the maximum peak amplitude.

17. The method of claim 11 wherein generating the first bit string further comprises applying a data compression function to the concatenated bit representations to minimize redundancy in the first bit string.

18. The method of claim 17 further comprises computing a plurality of hash values for contiguous sections of the first bit string.

19. The method of claim 1 wherein prior to generating the first and second sensor profiles, the method includes receiving, by a low pass filter in the first and second sensors, the sensory input, wherein the generated first and second profiles correspond to the filtered sensory input.

20. A non-transitory computer-readable medium carrying one or more sequences of instructions for providing a bit string on at least two electronic devices, which instructions, when executed by one or more processors, cause the one or more processors to perform operations comprising:

recording, by a first electronic device and by a second sensor in a second electronic device, a sensory input received by a first sensor in the first electronic device and a second sensor in the second electronic device;

generating, by the first electronic device, a first sensor profile corresponding to the sensory input, wherein the first sensor profile comprises a plurality of first data points that include at least one first peak data point associated with at least one peak amplitude and at least one first valley data point associated with at least one valley amplitude;

determining, by the first electronic device, a first sampling frequency based on a time interval between a zero data point associated with a zero amplitude and one of a nearest first peak data point and a nearest first valley data point;

generating, by the first electronic device, a first bit string based on a first set of sampled data points of the plurality of first data points, the first set of sampled data points identified based on the first sampling frequency;

generating, by the second electronic device, a second sensor profile corresponding to the sensory input, wherein the second sensor profile comprises a plurality of second data points that include at least one second peak data point and at least one second valley data point;

determining, by the second electronic device, a second sampling frequency based on a time interval between a zero data point and one of a nearest peak data and a nearest valley data point; and generating, by the second electronic device, a second bit string based on a second set of sampled data points of the plurality of second data points, the second set of sampled data points identified based on the second sampling frequency, wherein the first bit string substantially matches the second bit string.

* * * * *